United States Patent
Carrillo

(10) Patent No.: US 9,948,502 B2
(45) Date of Patent: Apr. 17, 2018

(54) METHOD AND SYSTEM FOR SELF-HEALING OF COMMUNICATION NETWORK

(71) Applicant: OpenPeak LLC, Plano, TX (US)

(72) Inventor: Juan Carlos Carrillo, Miami, FL (US)

(73) Assignee: OpenPeak LLC, Plano, TX (US)

( * ) Notice: Subject to any disclaimer, the term of this patent is extended or adjusted under 35 U.S.C. 154(b) by 0 days.

(21) Appl. No.: 14/541,481

(22) Filed: Nov. 14, 2014

(65) Prior Publication Data
US 2015/0138945 A1    May 21, 2015

Related U.S. Application Data

(60) Provisional application No. 61/904,771, filed on Nov. 15, 2013.

(51) Int. Cl.
*H04L 1/00* (2006.01)
*H04L 12/24* (2006.01)
*H04L 29/08* (2006.01)
*H04L 12/58* (2006.01)

(52) U.S. Cl.
CPC ...... *H04L 41/0654* (2013.01); *H04L 41/0686* (2013.01); *H04L 51/24* (2013.01); *H04L 51/28* (2013.01); *H04L 51/30* (2013.01); *H04L 67/26* (2013.01); *H04L 12/587* (2013.01);
(Continued)

(58) Field of Classification Search
CPC ..... H04L 41/0654; H04L 51/28; H04L 51/24; H04L 51/30; H04L 41/0686; H04L 67/26; H04L 12/587; H04L 12/588; H04L 51/32; H04L 41/069; H04L 41/0695
See application file for complete search history.

(56) References Cited

U.S. PATENT DOCUMENTS 8,015,152 B2 *  9/2011  Ozhan ............... G06Q 10/107
                                                   707/613
8,615,581 B2 * 12/2013  Dare ................. H04L 41/0253
                                                   370/352
(Continued)

OTHER PUBLICATIONS

International Search Report and Written Opinion for International Application No. PCT/US 2014/065663, mailed Apr. 6, 2015, 10 pages.

*Primary Examiner* — Brian O'Connor

(57) ABSTRACT

A method of self-healing a communication network is described herein. In particular, a plurality of message addresses can be registered with a publisher, and notifications from the publisher for the message addresses can be received. In addition, the notifications received from the publisher for the message addresses can be time-stamped. A notification interval for the message addresses can be monitored in which the interval may be based on a predetermined amount of time. The time-stamps of the received notifications can be compared to the notification intervals to determine whether a disruption in the receipt of the notifications for at least some of the message addresses has occurred. If a disruption has been determined to have occurred, the message addresses that have been affected by the disruption can be deleted. The deleted message addresses can then be re-registered with the publisher to restore the receipt of the notifications from the publisher for the affected message addresses.

19 Claims, 3 Drawing Sheets

(52) U.S. Cl.
CPC .......... *H04L 12/588* (2013.01); *H04L 41/069* (2013.01); *H04L 41/0695* (2013.01); *H04L 51/32* (2013.01)

(56) References Cited

U.S. PATENT DOCUMENTS

| | | | |
|---|---|---|---|
| 8,713,173 B2* | 4/2014 | Kacherov | H04L 63/20 455/456.4 |
| 8,856,322 B2* | 10/2014 | Dare | G06F 9/4445 709/224 |
| 9,124,493 B2* | 9/2015 | Kacherov | H04L 63/20 |
| 9,191,354 B2* | 11/2015 | Yin | H04L 51/30 |
| 2006/0031330 A1* | 2/2006 | Ruiz | G06Q 30/0217 709/206 |
| 2007/0198677 A1 | 8/2007 | Ozhan et al. | |
| 2007/0249325 A1 | 10/2007 | Blight et al. | |
| 2009/0157831 A1* | 6/2009 | Tian | H04L 12/587 709/206 |
| 2010/0146062 A1* | 6/2010 | Eriksson | H04L 51/28 709/206 |
| 2010/0284269 A1* | 11/2010 | Zhu | G06F 11/0757 370/221 |
| 2011/0289172 A1 | 11/2011 | Marcellino | |
| 2012/0036552 A1 | 2/2012 | Dare et al. | |
| 2012/0173645 A1* | 7/2012 | Marcellino | H04L 12/587 709/206 |
| 2012/0303774 A1 | 11/2012 | Wilson et al. | |
| 2016/0105522 A1* | 4/2016 | Somani | H04L 63/0884 709/219 |

* cited by examiner

100

METHOD AND SYSTEM FOR SELF-HEALING OF COMMUNICATION NETWORK

CROSS-REFERENCE TO RELATED APPLICATIONS

This patent application claims priority to U.S. Patent Provisional Application No. 61/904,771, filed on Nov. 15, 2013, which is incorporated herein by reference in its entirety.

FIELD OF TECHNOLOGY

The present description relates to methods and systems for the maintenance of communication networks and more particularly, the maintenance of communication networks through automated corrective processes.

BACKGROUND

Currently, many enterprises have made arrangements to enable their employees or associates to receive and compose work email messages on their mobile devices. Typically, a secure gateway is communicatively coupled with a message server, both of which are assigned to the enterprise. The secure gateway may provide numerous email addresses to the message server to facilitate the exchange of messages between the mobile devices and the message server. For example, when a message is received for a particular client, the message server may notify the secure gateway, which can then notify the relevant mobile device. As part of this service, the secure gateway may be required to notify a push notification service, which will then perform the task of notifying the mobile device of the received message.

While this arrangement has been generally successful in ensuring message exchange between the message server and the mobile devices, certain technical issues have arisen that sometimes interfere with this process. In particular, the message server may crash or otherwise suffer from some outage of service. In this case, the message server may be unable to notify the secure gateway of any incoming messages or to process outgoing messages from the mobile devices. Moreover, it may be some time before the problem with message delivery is detected, thereby preventing the subscribers from receiving messages for extended periods. Even worse, any messages that may have been generated during the time of the outage may be forever lost, which can lead to frustration on the part of the users of the mobile devices.

SUMMARY

A method of self-healing a communication network is described herein. The method can include the steps of registering a plurality of message addresses with a publisher, receiving notifications from the publisher for the message addresses, and time-stamping the notifications received from the publisher for the message addresses. The method can also include the steps of monitoring a notification interval for the message addresses in which the interval is based on a predetermined amount of time and comparing the time-stamps of the received notifications to the notification intervals to determine whether a disruption in the receipt of the notifications for at least some of the message addresses has occurred. If a disruption has been determined to have occurred, the message addresses that have been affected by the disruption can be deleted. In addition, the deleted message addresses can be re-registered with the publisher to restore the receipt of the notifications from the publisher for the affected message addresses.

As an example, the notifications are messages that are intended for delivery to the message addresses or heartbeats from the publisher for the messages addresses. The method can also include the step of polling for the message addresses that have been affected by the disruption. This step can include polling for new message addresses that have yet to be registered with the publisher.

As another example, re-registering the deleted message addresses with the publisher can include re-registering the deleted message addresses with the publisher as new message addresses. The method can also include the step of setting the notification intervals for the message addresses. For example, setting the notification intervals for the message addresses can include setting the notification intervals for the message addresses in a uniform manner or in a varying manner. The varying manner may be based on an affiliation of users of the message addresses, time of day or location of a computing device to which the message address is attached.

Another method of self-healing a communication network is described herein. This method can include the steps of initially registering a plurality of message addresses with a messaging server and setting a notification interval for each of the registered message addresses. The method can also include the steps of selectively deleting the registered message addresses that have not received a notification during the notification interval and re-registering the deleted message addresses with the publisher. The method can further include the steps of time-stamping the notifications that are received for each of the registered message addresses and comparing the time-stamp of the received notifications with their associated notifications intervals to determine whether a disruption has occurred for the message addresses. As an example, re-registering the deleted message addresses with the publisher in this method can include re-registering the deleted message addresses with the publisher as new message addresses.

A self-healing communication network is also described herein. The network can include a publication unit that can be configured to provide a messaging service and can include a subscriber unit that may be configured to register message addresses with the publication unit. The subscriber unit can be further configured to receive notifications from the publication unit for the registered message addresses and to delete any message addresses should it be determined that notifications for those message addresses have not been received within a notification interval. Moreover, the subscriber unit can be further configured to re-register with the publication unit the message addresses that were deleted to restore messaging service for those message addresses. As an example, the publication unit is an email server. In another embodiment, the subscriber unit includes a secure gateway and a management platform that can be configured to manage and support a plurality of mobile devices.

In one arrangement, the message addresses are associated with computing devices that are configured to receive push notifications that indicate that a message has been received for a message address. As another example, the subscriber unit can be further configured to re-register the deleted message addresses with the publication unit as new message addresses. In addition, the publication unit can be further configured to generate new subscription identifiers for the re-registered message addresses. In another arrangement, the notification interval can be uniform for all message addresses or can be different for at least some message addresses. In some cases, the notifications that the subscriber unit receives may be received messages or heartbeats.

A non-transitory computer readable storage medium having stored thereon computer-readable program code is also described herein. When executed by a system that includes a processing unit and a memory, the program code causes the system to initially register a plurality of message addresses with a messaging server and set a notification interval for each of the registered message addresses. The program code may also cause the system to selectively delete the registered message addresses that have not received a notification during the notification interval and re-register the deleted message addresses with the publisher.

Further features and advantage, as well as the structure and operation of various embodiments, are described in detail below with reference to the accompanying drawings. It is noted that this description is not limited to the specific embodiments presented herein. Such embodiments are provided for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Figure 1:
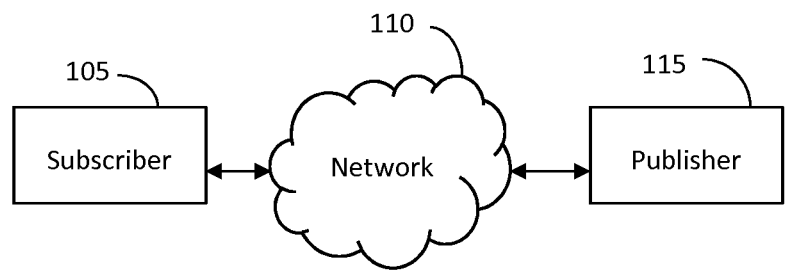
FIG. 1 illustrates an example of a self-cleaning system.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described. The term "among," as it is used throughout this description, should not necessarily be interpreted as requiring exchanges or interaction among three or more applications, irrespective of grammar rules.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged (directly or indirectly) between the components on a unidirectional or bidirectional (or multi-directional) manner, either wirelessly, through a wired connection or a combination of both. A "computing device" is defined as a component that is configured to perform some process or function for a user and includes both mobile and non-mobile devices. The term "non-transitory computer readable storage medium" is defined as one or more non-transitory components that are configured to store instructions that are to be executed by one or more processing units.

An "application" is defined as a program or programs that perform one or more particular tasks on a computing device. Examples of an application include programs that may present a user interface for interaction with a user or that may run in the background of an operating environment that may not present a user interface while in the background. The term "operating system" is defined as a collection of software components that directs a computing device's operations, including controlling and scheduling the execution of other programs and managing storage, input/output and communication resources. A "processing unit" is defined as one or more components that execute sets of instructions, and the components may be disparate parts or part of a whole unit and may not necessarily be located in the same physical location. The term "memory" or "memory element" is defined as one or more components that are configured to store data, either on a temporary or persistent basis. The term "shared memory" is memory or a memory element that is accessible (directly or indirectly) by two or more applications or other processes. An "interface" is defined as a component or a group of components that enable(s) a device to communicate with one or more different devices, whether through hard-wired connections, wireless connections or a combination of both. The term "file system" is defined as an abstraction that is used to organize, store and retrieve data.

The term "self-healing" is defined as a characteristic or trait in which a component or group of components are able to detect a disruption, outage or inoperative condition and to take corrective action to alleviate or resolve such an issue. A "message" is defined as a communication that includes data or information. A "message address" is defined as information or data that identifies a destination or location that is capable of at least receiving messages. A "notification" is defined as information or data that is associated with a message address and that may be used to provide an indication as to the operating condition of a messaging service for that message address. A "publisher" or "publication unit" is defined as a component or a group of components that provide a messaging service for one or more messaging addresses. A "subscriber" or "subscriber unit" is defined as a component or a group of components that register message addresses with a publisher or publication unit for purposes of at least receiving messages from the publisher or publication unit. The terms "time-stamp" or "time-stamping" are defined as a process, state or condition in which a notification or some other event is tagged or otherwise associated with a time or an ordering position. A "notification interval" is defined as an interval of time that serves as a basis when determining whether a notification should have been received or detected for a particular message address.

As explained earlier, solutions have been developed to enable employees to receive and send emails on their mobile devices on behalf of their employers. Unfortunately, the systems set up for such message exchange may suffer from occasional outages, which may lead to employees not receiving their emails for an extended period of time. Even worse, many of these messages are lost and never recovered. Ensuring the reliability of these messaging systems is of paramount importance.

A self-healing a communication network and a method of operating the same that may alleviate this problem are described herein. In particular, a plurality of message addresses can be registered with a publisher, and notifications from the publisher for the message addresses can be received. In addition, the notifications received from the publisher for the message addresses can be time-stamped. A notification interval for the message addresses can be monitored in which the interval may be based on a predetermined amount of time. The time-stamps of the received notifications can be compared to the notification intervals to determine whether a disruption in the receipt of the notifications for at least some of the message addresses has occurred. If a disruption has been determined to have occurred, the message addresses that have been affected by the disruption can be deleted. The deleted message addresses can then be re-registered with the publisher to restore the receipt of the notifications from the publisher for the affected message addresses.

As such, any disruptions in a messaging service can be quickly detected and, and corrective action can be taken to ensure that no messages are lost. Moreover, the corrective action can be performed automatically, and such a process can minimize interruptions to technical staff normally called upon to solve such issues.

Referring to FIG. 1, an example of a self-healing system 100 is shown. The system 100 can include one or more subscribers or subscriber units 105, one or more networks 110 and one or more publishers or publication units 115. The publisher 115 can be configured to facilitate the delivery of messages on behalf of the subscriber 105, and the network 110 can communicatively couple the subscriber 105 with the publisher 115. The messages that the publisher 115 processes for the subscriber 105 can be any suitable form of communication. Examples of such communications are email, SMS/MMS, instant messaging, voice and audio, video, etc., including any suitable combination of the foregoing. In addition, the publisher 115 can support bi-directional communications for the subscriber 105.

In summary, the subscriber 105 can initially register any number of message addresses with the publisher 115. Once a message address is registered with the publisher 115, the publisher 115 can provide a messaging service for that address. The message address may be associated with virtually any type of component, including mobile devices, laptops, desktop computers, servers, etc. In one arrangement, the subscriber 105 or some other component can monitor the messaging service provided by the publisher 115. If the subscriber 105 determines that there is a disruption in the messaging service, the subscriber 105 can automatically take corrective action to restore it. As an example, the subscriber 105 can delete the affected message addresses and can re-register them with the publisher 115. This process can re-establish the messaging service for the affected message addresses.

Figure 2:
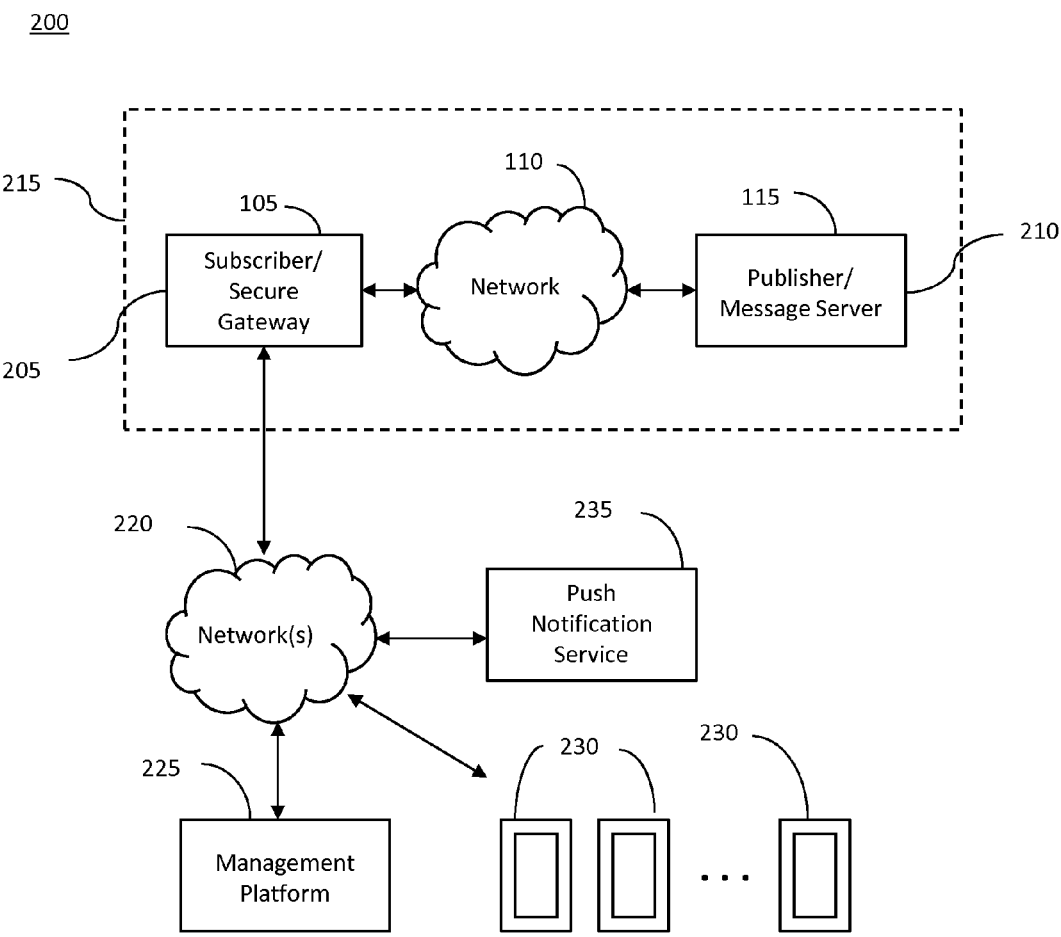
FIG. 2 illustrates another example of a self-cleaning system.

Referring to FIG. 2, a more detailed example of a self-healing system 200 is shown. The system 200 can include the subscriber 105, the network 110 and the publisher 115 that were previously described with respect to FIG. 1. In this example, the subscriber 105 can be a secure gateway 205, and the publisher 115 can be a messaging server 210. In one particular example, the publisher 115 can be an email messaging server configured to provide email service for the subscriber 105. In one arrangement, the subscriber 105 and the publisher 115 can be contained within the same ecosystem 215, and the network 110 can be an internal network. For example, an enterprise may operate the publisher 115 and the subscriber 105, and the network 110 can be a network that limits access to only authorized associates of the enterprise.

The system 200 can also include one or more other networks 220 for facilitating communications between various components of the system 200. As an example, the network(s) 220 may be composed of various types of components to support wireless or wired communications (including both) and may be configured to support both local or wide area communications (or both). In one arrangement, the system 200 can also include a management platform 225, which may provide numerous services for managing a plurality of computing devices 230. Earlier presentations have been provided that illustrate a solution that describes some of these services, such as in U.S. Pat. No. 8,615,581, issued on Dec. 24, 2013, which is incorporated by reference herein in its entirety. The system 200 may also have a push notification service 235, which may be configured to push messaging notifications to the computing devices 230, a process that is known in the art.

As noted earlier, the subscriber 105 and the publisher 115 may be part of a single ecosystem 215 that may be under the control of an enterprise. In this case, the enterprise may also be responsible for operating the management platform 225, and the computing devices 230 may be associated with the enterprise. In another arrangement, the enterprise may delegate the operation of any one of these components to another entity that may or may not be under the control of the enterprise. The push notification service 235 may be under the control of a separate entity, as well, such as a manufacturer of some of the computing devices 230 or a provider of an operating system for such devices 230. In another case, the management platform 225 may be considered part of the subscriber 105 such that the subscriber 105 comprises both the management platform 225 and the secure gateway 205. The system 200 may also be set up without the management platform 225, as its inclusion may be entirely optional. In fact, the configuration of the system 200 is intended to be versatile, and one skilled in the will appreciate that any number of entities may operate and control any suitable number of components of the system 200.

Figure 3:
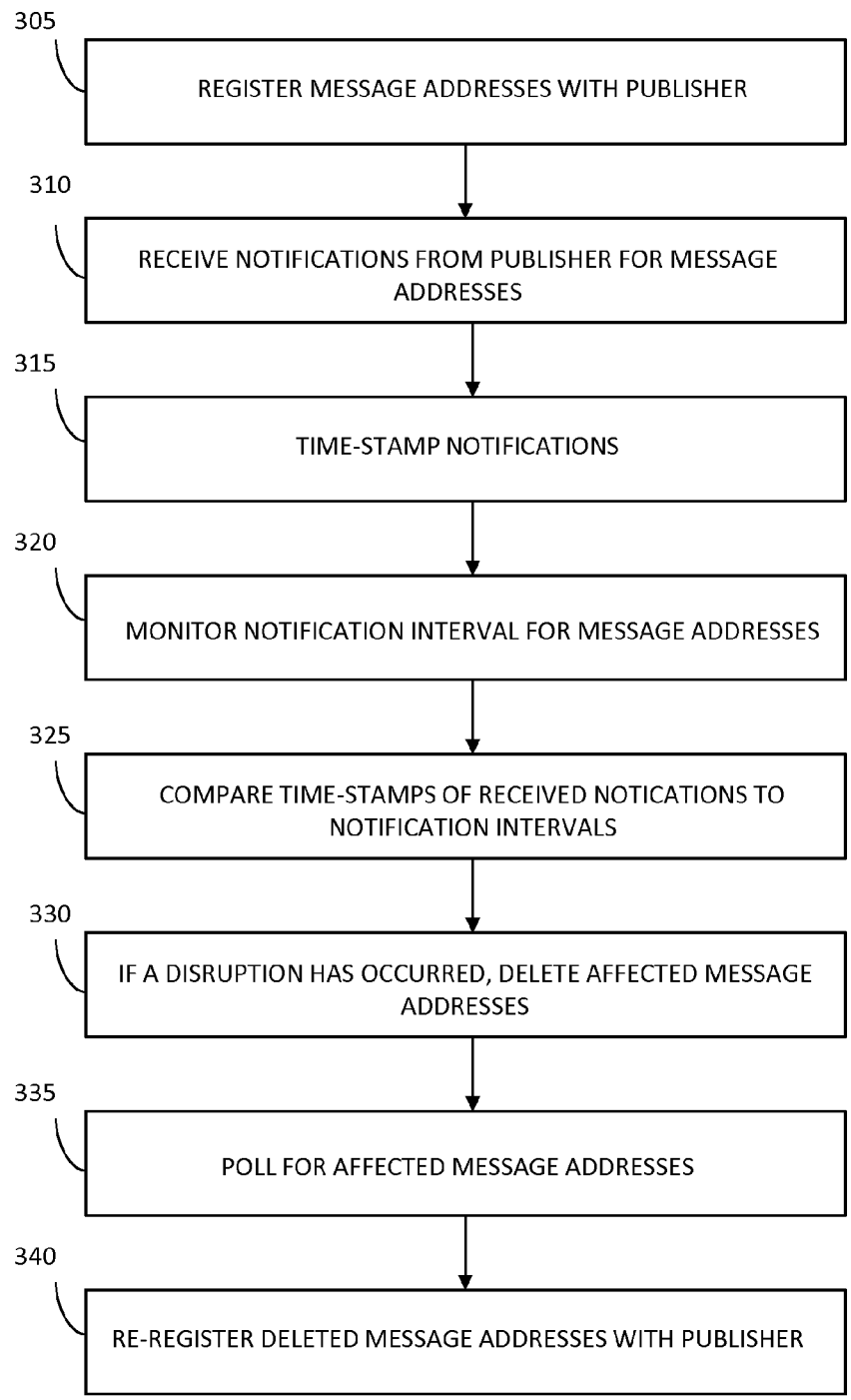
FIG. 3 illustrates an example of a method of self-cleaning a communications network.

Referring to FIG. 3, an exemplary method 300 for self-healing a communication network is illustrated. It is important to note, however, that the method 300 may include additional or even fewer steps or processes in comparison to what is illustrated in FIG. 3. Moreover, the method 300 is not necessarily limited to the chronological order that is shown in FIG. 3. In describing the method 300, reference may be made to FIGS. 1-2, although it is understood that the method 300 may be practiced with any other suitable systems and components and may take advantage of other suitable processes.

At step 305, a plurality of message addresses can be registered with a publisher, and notifications can be received from the publisher for the message addresses, as shown at step 310. In addition, at step 315, the notifications received from the publisher for the message addresses can be time-stamped.

For example, the subscriber 105 (or the secure gateway 205) may register any number of message addresses with the publisher 115 (or message server 210). This process can establish accounts for the message addresses to enable the publisher 115 to provide messaging service to the components associated with the message addresses. In particular, the message addresses can be related to the computing devices 230, and the user of these devices 230 may be able to send and receive messages that are associated with an enterprise that controls or operates the publisher 115. As an example, the messaging service can be an email service, and the publisher 115 can be an email server, although other messaging services may be supported by these arrangements.

As part of registering the message addresses, notification intervals, which may be based on a predetermined amount of time, can be set for one or more or all of the registered message addresses. Notifications that are received during a notification interval can provide an indication as to the status or operability of a registered message address. In particular, the publisher 115 can be configured to generate a heartbeat or some other indicator for the registered message addresses for delivery to the subscriber 105 or some other component. As an example, the publisher 115 can be configured to generate and deliver the heartbeat for the registered message addresses at least once during a notification interval for the registered addresses. As a more specific example, the notification interval may be set for a predetermined time, such as thirty minutes, and the publisher 115 may generate and deliver to the subscriber 105 one or more heartbeats during this predetermined time. If a heartbeat is received for a message address during the notification interval, then it may be determined that the messaging service for that address is active or operational. Conversely, if no heartbeat is received for a messaging address during the notification interval, then it may be determined that there is a disruption in the messaging service for that address. This process can allow the heartbeat to serve as a notification.

In addition to a heartbeat, a received message can serve as a notification. For example, if the subscriber 105 or some other component receives or does not receive a message for a registered address during the notification interval, then it may be determined that a disruption in the messaging service may or may not exist for that address. Other events may also serve as a notification, either in addition to or in lieu of the received heartbeats and messages. For example, system messages that are generated by the publisher, such as operational checks or system compliance notices, and are to be delivered to the computing device may be considered notifications.

The generation of heartbeats may be optional, as the receipt of messages can be used as the sole indicator for the notification interval. In addition, some registered addresses may use the receipt of messages as the sole indication, while others may rely on both messages and heartbeats as the indications. Notification intervals may be uniform for all registered messages addresses, or they may be different for the addresses. For example, a message address that does not receive much traffic may have a longer notification interval in comparison to another address that typically receives many messages. As another example, the notification intervals of registered messages addresses may be set based on the affiliations that the users of the addresses maintain. Specifically, a user who is a critical employee for an enterprise may have a shorter notification interval in comparison to one who is not as important, as the enterprise may wish to detect and repair service outages more quickly for the critical employee. In either arrangement, the notification intervals may be altered once they are set and may be adjusted based on certain factors, like time of day or location of the relevant computing device 230.

Whatever notifications are used, the notification received from the publisher 115 (or some other component) can be time-stamped, which can assist in determining whether service for a particular message address has been disrupted. For example, for incoming heartbeats or messages, the subscriber 105 or some other component can tag them with the time that they are received by the subscriber 105 or some other component. The heartbeats or messages may also be tagged with some other value, like a counter increment or some other designation that can provide an indication as to whether a notification was received within a notification interval.

Referring back to the method 300, at step 320, the notification intervals for the message addresses can be monitored. Also, at step 325, the time-stamps of the received notifications can be compared to the notification intervals to determine whether a disruption in the receipt of the notifications has occurred for at least some of the message addresses. If a disruption has occurred, the affected message addresses can be deleted, as shown at step 330. In addition, at step 335, affected message addresses can be polled for, and at step 340, the deleted message addresses can be re-registered with the publisher.

In one arrangement, the management platform 225 can monitor the notification intervals for the registered addresses. For example, the management platform 225 can, at the expiration of the notification interval, obtain the time-stamps of the notifications or some other information from which the time-stamps of the notifications can be retrieved. In one arrangement, the secure gateway 205 can provide the time-stamps or relevant information to the management platform 225, which can then compare the time-stamp of the last-received notification with the just-expired notification interval for a message address. If the time-stamp of the last-received notification is within the range of the just-expired notification interval, then the management platform 225 can determine that the messaging service for that message address is operational. Conversely, if the time-stamp is beyond the range of the notification interval, then the platform 225 can determine that a disruption in service may have occurred for the message address in question. Although the management platform 225 is described as performing these steps, other suitable components can be configured to do so, such as the secure gateway 205.

If the management platform 225 determines that there is no disruption in service for the message addresses, then the management platform 225 can repeat the process of monitoring the notification intervals for the message addresses. If a disruption in service is detected, steps can be taken to correct the outage for the affected message addresses. As an example of a corrective action, the management platform 225 can delete the affected message addresses. The term "delete the message address" is defined as an act in which a message address is removed, erased, expunged, canceled or otherwise rendered inactive in relation to an associated messaging service.

In addition, the management platform 225 can treat the deleted message addresses as new message addresses. As part of its operating procedure, the secure gateway 205 may poll the management platform 225 for new message addresses that need to be registered with the publisher 115. For example, when a new computing device 230 is initiated, the new computing device 230 may register with the management platform 225. When the secure gateway 205 polls the management platform 225 and receives the new message address for the just-initiated computing device 230, the secure gateway 205 can register the new message address with the publisher 115. In turn, the publisher 115 can initiate the messaging service for the new computing device 230.

Similarly, when the secure gateway 205 polls the management platform 225 for the new message addresses, those message addresses that were previously deleted may be treated as new message addresses. Accordingly, the secure gateway 205 can re-register the deleted message addresses as new messages with the publisher, which can re-establish the messaging service for the deleted message addresses. As part of this re-registration process, the publisher 115 may generate new subscription identifiers for the relevant message addresses. The re-registration of the deleted message addresses can restore the receipt of the notifications from the publisher 115 for the affected message addresses, and the step of monitoring for service disruptions, as described above, can continue. This detection of an interruption in service and its subsequent restoration may occur without any input of the user of the affected computing device 230. As an option, however, a message may be displayed to the user or an administrator that provides an indication of the problem and an estimate of how long it will take to correct it.

While various embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A method of self-healing a communication network, comprising:
    registering a plurality of message addresses with a publisher;
    receiving notifications from the publisher for the message addresses;
    time-stamping the notifications received from the publisher for the message addresses;
    monitoring a notification interval for the message addresses, wherein the interval is based on a predetermined amount of time;
    comparing the time-stamps of the received notifications to the notification intervals to determine whether a disruption in the receipt of the notifications for at least some of the message addresses has occurred;
    if a disruption has been determined to have occurred, deleting the message addresses that have been affected by the disruption; and
    re-registering the deleted message addresses with the publisher to restore the receipt of the notifications from the publisher for the affected message addresses.

2. The method according to claim 1, wherein the notifications are messages that are intended for delivery to the message addresses or heartbeats from the publisher for the messages addresses.

3. The method according to claim 1, further comprising polling for the message addresses that have been affected by the disruption.

4. The method according to claim 3, wherein polling for the message addresses that have been affected by the disruption comprises polling for new message addresses that have yet to be registered with the publisher.

5. The method according to claim 1, wherein re-registering the deleted message addresses with the publisher comprises re-registering the deleted message addresses with the publisher as new message addresses.

6. The method according to claim 1, further comprising setting the notification intervals for the message addresses.

7. The method according to claim 6, wherein setting the notification intervals for the message addresses comprises setting the notification intervals for the message addresses in a uniform manner or in a varying manner, wherein the varying manner is based on an affiliation of users of the message addresses, time of day or location of a computing device to which the message address is attached.

8. A method of self-healing a communication network, comprising:
    initially registering a plurality of message addresses with a messaging server;
    setting a notification interval for each of the registered message addresses;
    selectively deleting the registered message addresses that have not received a notification during the notification interval; and
    re-registering the deleted message addresses with the publisher.

9. The method of claim 8, further comprising time-stamping the notifications that are received for each of the registered message addresses.

10. The method according to claim 9, further comprising comparing the time-stamps of the received notifications with their associated notifications intervals to determine whether a disruption has occurred for the message addresses.

11. The method according to claim 8, wherein re-registering the deleted message addresses with the publisher comprises re-registering the deleted message addresses with the publisher as new message addresses.

12. A self-healing communication network, comprising:
   a publication unit that is configured to provide messaging service; and
   a subscriber unit that is configured to register message addresses with the publication unit;
   wherein the subscriber unit is further configured to receive notifications from the publication unit for the registered message addresses and to delete any message addresses should it be determined that notifications for those message addresses have not been received within a notification interval;
   wherein the subscriber unit is further configured to re-register with the publication unit the message addresses that were deleted to restore messaging service for those message addresses.

13. The communication network of claim 12, wherein the publication unit is an email server.

14. The communication network of claim 12, wherein the subscriber unit comprises a secure gateway and a management platform that is configured to manage and support a plurality of mobile devices.

15. The communication network of claim 12, wherein the message addresses are associated with computing devices that are configured to receive push notifications that indicate that a message has been received for a message address.

16. The communication network according to claim 12, wherein the subscriber unit is further configured to re-register the deleted message addresses with the publication unit as new message addresses.

17. The communication network according to claim 16, wherein the publication unit is further configured to generate new subscription identifiers for the re-registered message addresses.

18. The communication network according to claim 12, wherein the notification interval is uniform for all message addresses or is different for at least some message addresses.

19. The communication network according to claim 18, wherein the notifications that the subscriber unit receives are received messages or heartbeats.

* * * * *

UNITED STATES PATENT AND TRADEMARK OFFICE
CERTIFICATE OF CORRECTION

PATENT NO. : 9,948,502 B2
APPLICATION NO. : 14/541481
DATED : April 17, 2018
INVENTOR(S) : Carrillo Page 1 of 1

It is certified that error appears in the above-identified patent and that said Letters Patent is hereby corrected as shown below:

In the Claims

Claim 10 recites "associated notifications intervals" and should be changed to —associated notification intervals—

Signed and Sealed this
Fourteenth Day of August, 2018

Andrei Iancu
*Director of the United States Patent and Trademark Office*